US012094249B2

(12) United States Patent
Correnti et al.

(10) Patent No.: US 12,094,249 B2
(45) Date of Patent: Sep. 17, 2024

(54) ACCESSIBILITY FEATURES FOR PROPERTY MONITORING SYSTEMS UTILIZING IMPAIRMENT DETECTION OF A PERSON

(71) Applicant: Alarm.com Incorporated, Tysons, VA (US)

(72) Inventors: Matthew Daniel Correnti, Newtown Square, PA (US); Michael Kelly, Washington, DC (US); Robert Nathan Picardi, Herndon, VA (US)

(73) Assignee: Alarm.com Incorporated, Tysons, VA (US)

( * ) Notice: Subject to any disclaimer, the term of this patent is extended or adjusted under 35 U.S.C. 154(b) by 217 days.

(21) Appl. No.: 17/104,680

(22) Filed: Nov. 25, 2020

(65) Prior Publication Data

US 2021/0158030 A1    May 27, 2021

Related U.S. Application Data

(60) Provisional application No. 62/941,074, filed on Nov. 27, 2019.

(51) Int. Cl.
*G06V 40/00* (2022.01)
*G06N 20/00* (2019.01)
(Continued)

(52) U.S. Cl.
CPC .............. *G06V 40/20* (2022.01); *G06N 20/00* (2019.01); *G06V 20/52* (2022.01); *H04W 4/12* (2013.01)

(58) Field of Classification Search
CPC ........ G06V 40/20; G06V 20/52; G06N 20/00; H04W 4/12
See application file for complete search history.

(56) References Cited

U.S. PATENT DOCUMENTS

| 8,659,417 | B1 | 2/2014 | Trundle et al. |
| 8,866,760 | B2 | 10/2014 | Corroy et al. |

(Continued)

FOREIGN PATENT DOCUMENTS

| CN | 102222431 | 3/2014 |
| WO | WO 2001/075653 | 10/2001 |
| WO | WO 2022/040217 | 2/2022 |

OTHER PUBLICATIONS

Elmannai et al., "Sensor-Based Assistive Devices for Visually-Impaired people: Current Status, Challenges, and Future Directions," Sensors, Mar. 10, 2017, Retrieved on Jan. 24, 2021 from <https://www.ncbi.nlm.nih.gov/pmdarticles/PMC5375851/pdf/sensors-17-00565.pdf>, 42 pages.

(Continued)

*Primary Examiner* — Pakee Fang
(74) *Attorney, Agent, or Firm* — Fish & Richardson P.C.

(57) ABSTRACT

Methods, systems, and apparatus, including computer programs encoded on computer storage media, for integrating a monitoring system with accessibility features. The method includes: receiving data from a sensor of a monitoring system that is configured to monitor a property; determining, based on the data received from the sensor, that a user located at the property exhibits symptoms of an impairment; determining that an event likely occurred at the property; determining a monitoring system action to perform in response to the event; modifying, based on determining that the user located at the property exhibits symptoms of the impairment, the monitoring system action; and performing the modified monitoring system action.

20 Claims, 4 Drawing Sheets

(51) Int. Cl.
  *G06V 20/52* (2022.01)
  *G06V 40/20* (2022.01)
  *H04W 4/12* (2009.01)

(56) References Cited

U.S. PATENT DOCUMENTS

| | | |
|---|---|---|
| 9,202,360 B1 | 12/2015 | Tedesco et al. |
| 10,777,097 B2 | 9/2020 | Kanuganti et al. |
| 10,848,932 B2 | 11/2020 | Lau et al. |
| 11,058,327 B2 | 7/2021 | Shuster et al. |
| 11,218,848 B2 | 1/2022 | Lau et al. |
| 11,323,464 B2 | 5/2022 | Jakobsson |
| 2006/0017561 A1 | 1/2006 | Albert |
| 2011/0163863 A1 | 7/2011 | Chatmon |
| 2012/0169503 A1 | 7/2012 | Wu et al. |
| 2014/0032433 A1 | 1/2014 | Eick et al. |
| 2014/0139655 A1 | 5/2014 | Mimar |
| 2014/0172467 A1* | 6/2014 | He .................. A61B 5/18 705/4 |
| 2014/0310610 A1 | 10/2014 | Ricci |
| 2015/0257681 A1 | 9/2015 | Shuster et al. |
| 2015/0339912 A1 | 11/2015 | Farrand et al. |
| 2017/0154512 A1 | 6/2017 | Lection et al. |
| 2018/0350213 A1* | 12/2018 | Bart .................. H04N 7/186 |
| 2018/0366029 A1* | 12/2018 | Kanuganti ........ H04N 21/2743 |
| 2019/0209022 A1* | 7/2019 | Sobol .................. A61B 5/0022 |
| 2019/0336046 A1* | 11/2019 | Shuster ................ G16H 50/20 |
| 2020/0039068 A1* | 2/2020 | Kim ...................... G06T 7/246 |
| 2020/0264598 A1* | 8/2020 | Sheng ............... G05B 23/0283 |
| 2021/0114514 A1* | 4/2021 | Karol ....................... G06N 5/04 |

OTHER PUBLICATIONS

PCT International Search Report and Written Opinion in International Application No. PCT/US2020/062286, dated Mar. 11, 2021, 11 pages.
Extended European Search Report in European Appln. No. 20891743.5, dated Dec. 19, 2022, 9 pages.
AU Examination Report in Australian Appln. No. 2020391477, dated May 8, 2023, 5 pages.
CA Office Action in Canadian Appln. No. 3,162,509, dated May 31, 2023, 4 pages.
AU Examination Report No. 2 in Australian Appln. No. 2020391477, dated Oct. 20, 2023, 5 pages.
Office Action in Australian Appln. No. 2020391477, mailed on Feb. 23, 2024, 16 pages.
Office Action in Canadian Appln. No. 3162509, mailed Feb. 20, 2024, 4 pages.

\* cited by examiner

ACCESSIBILITY FEATURES FOR PROPERTY MONITORING SYSTEMS UTILIZING IMPAIRMENT DETECTION OF A PERSON

CROSS-REFERENCE TO RELATED APPLICATION

This application claims the benefit of U.S. Provisional Application No. 62/941,074, filed on Nov. 27, 2019, the contents of which are incorporated by reference herein in its entirety.

TECHNICAL FIELD

This disclosure relates to property monitoring technology and, for example, providing accessibility to features of a monitoring system based on users or other persons at a property.

BACKGROUND

Many people equip homes and businesses with monitoring systems to provide increased security for their homes and businesses. These monitoring systems include several electronic components including sensors that may detect several different activities within the monitored property.

SUMMARY

Techniques are described for using sensors and connected system components within a monitoring system framework to detect a user with an impairment and assist them using the connected system components. The current user can be anyone within a monitoring system's radius or the owner of the monitoring system depending on the implementation.

In one aspect, the disclosure provides a method including receiving data from a sensor of a monitoring system that is configured to monitor a property; determining, based on the data received from the sensor, that a user located at the property exhibits symptoms of an impairment; determining that an event likely occurred at the property; determining a monitoring system action to perform in response to the event; modifying, based on determining that the user located at the property exhibits symptoms of the impairment, the monitoring system action; and performing the modified monitoring system action.

In some implementations, determining that the user located at the property exhibits symptoms of the impairment includes: analyzing the data received from the sensor; and comparing the analyzed data to data corresponding to known impairments.

In some implementations, determining that the user located at the property exhibits symptoms of the impairment includes: providing the data received from the sensor to a machine learning model; and determining that the user located at the property exhibits symptoms of the impairment based on output of the machine learning model.

In some implementations, updating an impairment profile corresponding to the user based on determining that the user located at the property exhibits symptoms of the impairment. In some implementations, modifying the monitoring system action includes: accessing the impairment profile corresponding to the user; and modifying the monitoring system action based on the impairment profile.

In some implementations, modifying the monitoring system action includes: obtaining a first alert method corresponding to the monitoring system action to perform in response to the event, where the first alert method is configured to be perceived by a first human sense; determining the impairment of the user affects the first human sense; determining a second alert method that is configured to be perceived by a second human sense, where the first human sense and the second human sense are not identical; and modifying the monitoring system action to include the second alert method.

In some implementations, modifying the monitoring system action includes: generating a hierarchy of monitoring system actions, where the hierarchy of the monitoring system actions is based on one or more values each representing a likelihood of a given monitoring system action of the monitoring system actions being perceived by the user that exhibits symptoms of the impairment; and based on the hierarchy of the monitoring system actions, modifying the monitoring system action.

In some implementations, generating the hierarchy of the monitoring system actions includes: determining a status for one or more connected components of the monitoring system, where the one or more connected components are used to implement one or more monitoring system actions; and based on the status of the one or more connected components, generating the hierarchy of the monitoring system actions.

Advantageous implementations can include one or more of the following features: algorithms within the monitoring system which can auto-detect impairments, as well as accept pre-programmed impairment settings; connected system components which can make environmental adjustments within the radius of connected system components; user detection, including impairment detection which can inform alert, communication, and environmental adjustments made by the monitoring system. This includes displaying visual cues for individuals incapable, or who struggle with, auditory alerts or communication as well as using auditory cues for individuals incapable, or who struggle with, visual alerts or communication. This also includes the capability to auto-detect events within the monitoring system's sensor range that warrant attention and to display that information in a manner consistent with the impairment settings determined via auto-detection or user settings. The monitoring system can also accept responses from an individual even if those responses are affected by an impairment (e.g. allowing sign language to be used in response to burglary detection or other emergency).

Implementations of the described techniques may include hardware, a method or process implemented at least partially in hardware, or a computer-readable storage medium encoded with executable instructions that, when executed by a processor, perform operations.

The details of one or more implementations are set forth in the accompanying drawings and the description below. Other features will be apparent from the description and drawings, and from the claims.

BRIEF DESCRIPTION OF THE DRAWINGS

Like reference numbers and designations in the various drawings indicate like elements.

DETAILED DESCRIPTION

Many residents and homeowners equip their properties with monitoring systems to enhance the security, safety, or convenience of their properties. The property monitoring systems can include one or more sensors that feedback data relevant to the property being monitored as well as the users within monitoring radius. Sensors can be anything capable of capturing information useful in the monitoring of user and property (e.g. video cameras, infrared cameras, motion sensors, microphones). These sensors pass data to the monitoring system that can then determine whether or not a user is impaired in some way and adjust the user-to-monitoring system interaction accordingly. For example, based on data collected by a group of sensors, the monitoring system may identify a user with a white cane and determine that the user may have a sight impairment. In response, the system can tailor notifications for this particularly user to utilize non-sight based notification techniques (e.g. audio, tactile). In another example, the monitoring system may determine that a user is likely deaf or hearing impaired. The system can expect the user may use sign language instead of speech to communicate with others on the property. It may be helpful for the monitoring system to be configured to interpret the user's sign language via visual sensors and processing algorithms to other individuals the user may be talking with either on the property or remotely. The monitoring system can also interpret communications made directly to the monitoring system in the event the user wishes to make system adjustments or communicate with system operators.

The details of one or more implementations of the subject matter described in this specification are set forth in the accompanying drawings and the description below. Other features, aspects, and advantages of the subject matter will become apparent from the description and the drawings.

Figure 1:
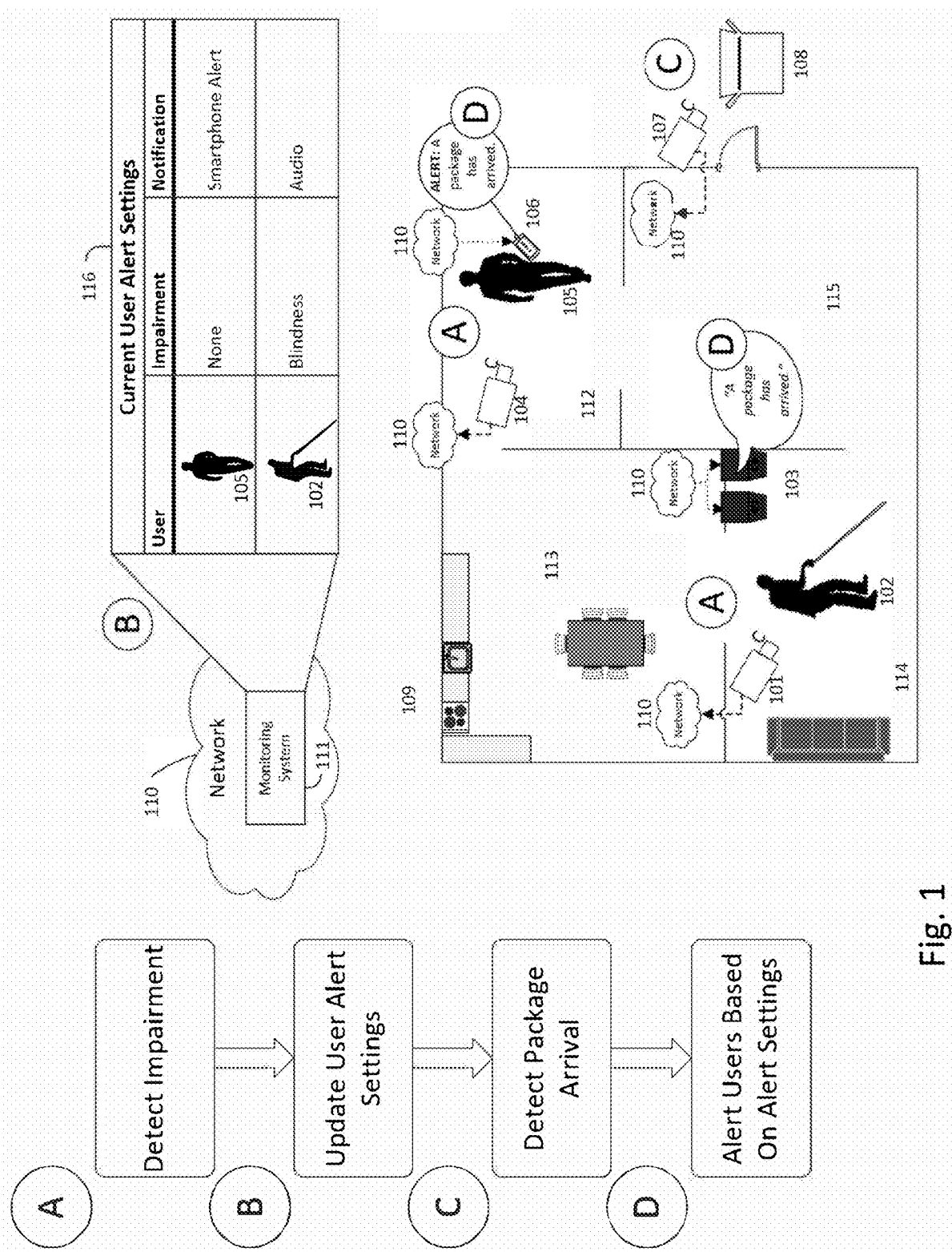
FIG. 1 is a diagram illustrating an example of a monitoring system equipped with impairment accessibility features.

FIG. 1 is a diagram illustrating an example of a monitoring system 111 equipped with impairment accessibility features. A network 110 connects, and is used to transfer data between, all parts of the monitoring system. In some implementations, the network 110 can exist as a wireless network. In others, the network can be wired.

The diagram in FIG. 1 shows one level of a property 109, with 4 separate rooms. Room 112 in the top right of the diagram contains a camera 104 that connects via network 110 with the other components of the monitoring system 111, a user 105, and a smartphone 106. Room 113 is a dining room area with no sensors or users. Room 114 in the bottom left of the diagram contains a camera 101 which connects via network 110 with the other components of the monitoring system 111, a user 102, and a set of home stereo speakers 103. Room 115 has no sensors or users. Other properties and monitoring system implementations can have different set-ups.

The property 109 can be a home, another residence, a place of business, a public space, or another facility that is monitored by a property monitoring system. The monitoring system includes one or more sensors 104 and 101 located at the property 109 that collect sensor data related to the property 109 and relays the data via a network to the monitoring system controls. For example, the sensors 104 and 101 can include motion detectors that sense movement in an area of the property 109. The sensors 104 and 101 can also include appliance sensors, door or window lock sensors, utility or resource usage sensors, microphones, temperature or humidity sensors, light detectors, or other sensors.

The sensors 104 and 101 in FIG. 1 are visible light cameras. The visible light camera can capture image or video data of the physical surroundings detectable within the camera's field of view. In some implementations, the visible light camera may be paired with one or more motion sensors, where detection of movement by the motion sensor triggers the visible camera to capture image or video data. In some implementations, the visible light camera can include a microphone for capturing audio data detected in the vicinity of the visible light camera.

The sensors 104 and 101 communicate with monitoring system components like home stereo speakers 103 and user smartphones 106 via the network 110. These components can be any electronic device able to communicate with the monitoring system 111.

The sensors 104 and 101 may communicate with the monitoring system through a network 110. The network 110 can be any communication infrastructure that supports the electronic exchange of data between the user interface modules 103 and 106, the one or more sensors 104 and 101, and the monitor system control. For example, the network 110 may include a local area network (LAN). The network 110 may be any one or combination of wireless or wired networks and may include any one or more of Ethernet, Bluetooth, Bluetooth LE, Z-wave, Zigbee, or Wi-Fi technologies.

In FIG. 1, property 109, room 113 and room 115 have no users while room 112 and room 114 do have users. In room 112, there is a person 105 walking unassisted. In room 114, there is a man 102 with a white cane. Rooms can be equipped with a number of sensors. The cameras 101 and 104, shown in rooms 114 and 112 respectively, are single cameras but can represent any number of sensors including cameras, motion sensors, microphones or any other devices installed within the existing monitoring system.

FIG. 1 shows a package 108 arriving at the front door. The monitoring system then alerts users of the package 108 arrival.

To the left of the diagram in FIG. 1, stages A through D show the progression of the example.

Stage A in FIG. 1 involves collecting data from the sensors, 104 and 101, to inform backend algorithms designed to detect specific impairments. These impairments may affect a user's ability to be notified during a notification worthy event. Camera 101 passes data via the network 110. The network 110 is able to transfer the data to the algorithms within the monitoring system. The monitoring system can exist as a computer, or group of computers, connected via the network 110 to sensors located at the property and executing programs that enable the monitoring system to perform actions in response to data streamed from sensors. Within the monitoring system, control algorithms determine the data related to user 102 corresponds with known characteristics of a blind person. This determination can be made by matching visual, motion and other sensor data to known characteristics that correspond with known impairments. Image analysis based on the feed from camera 101 shows a white cane moving back and forth in front of user 102. The monitoring system can match this analysis with existing data to reach a conclusion. The monitoring system summarily determines that user 102 is blind. In the same manner, sensor 104 passes data via the network 110. The network 110 is able to transfer the data to the algorithms within the monitoring system. Within the monitoring system, a determination is made that the data related to user 105 corresponds with known characteristics. The monitoring system determines that user 105 does not have any impairment. This determination can be made by matching visual, motion and other sensor data to known characteristics which correspond with known impairments. The walking motion, gait, and step frequency correspond to known data of non-impaired persons. The monitoring system infers from the sensor 104 data that user 105 likely experiences no impairments.

In some implementations, users with different outward characteristics may evoke different settings and would therefore be registered within the monitoring system as needing different forms of interaction. Alternate methods of determining user impairments can be used including, but not limited to, machine learning, model based decisions and neural networks. Any number of sensors within the monitoring system can be used to inform the various methods of impairment determination.

Stage B in FIG. 1 involves setting the user alert settings based on the impairment algorithm's decision. In some implementations, the monitoring system can have other options but, only two are shown here: audio alerts via home stereo speakers 103 and default notifications via smartphone 106. Based on the decision made in stage A, the monitoring system sets the alert of user 102 to the default notifications via smartphone 106 and the alert of user 105 to audio alerts via home speakers 103. In other implementations, the default option can be different. For example, visual alarms could be used. This could be useful for those hard of hearing but could be set for any particular user. The monitoring system can activate any light producing device in the vicinity of the user to flash. This includes, but is not limited to, overhead lights, smartphone cameras flashes, smartphone screens, TVs, and control panels. In some implementations, the light used may be non-white. Multiple visual and other alarm choices can be presented as choices on the system. Alarms can be mixed and matched according to user preferences and monitoring system 111 logic.

The audio alarms of the monitoring system will be any audible sound instigated via the monitoring system in response to a detection of an alarm worthy stimulus. This includes, but is not limited to, beeps, music, and jingles. Multiple audio alarm choices can be presented as choices on the system.

Other alarms will include any disturbance sent by the monitoring system in which, having perceived the disturbance, a user could assume a notification has been delivered. All these alarm possibilities can be chosen by users manually or set via automatic detection by the monitoring system.

Stages A and B in this example take place before the package 108 arrival. However, stages A and B are not necessarily tied to the package 108 delivery event and can take place at any time while the users are within range of the monitoring sensors. That is, a detection of impairment (stage A) and subsequent updating of the user alert settings (stage B) can take place many times before any package arrival. Upon package arrival (stage C), both detection and user settings update (stages A and B) must have taken place in order for the alerts to be guaranteed registered by users with impairments.

Stage C in FIG. 1 is the detection of the package 108. Camera 107 sends data to the monitoring system via the network 110. The algorithms within the monitoring system 111 then uses the data to match the sensor input with known characteristics of different events. In this example, the sensory input collected by camera 107 correspond with the likely characteristics of a package arrival. This qualifies as an event the monitoring system may relay to users. The manner of the relay is dependent upon the alert settings programmed from stage B.

The particular event can be anything noteworthy and is not tied directly to the package 108 delivery. Other possible events could include burglaries, solicitation, a car entering a driveway, a car parked outside, or any other notification worthy event registered by the components within a monitoring system. What constitutes a notification worthy event can be tuned automatically or via user preferences.

Stage D in FIG. 1 is the process of alerting users based on alert settings. In stage A, the monitoring system 111 processes an impairment profile for each user. In stage B, the monitoring system 111 updates current user alert settings 116 according to the impairments determined. In stage C, the monitoring system 111 receives data from camera 107 that is processed by visual algorithms which determine that a package 108 has likely been delivered to property 109. Upon the event detection of the delivery of package 108, the monitoring system 111 alerts users 102 and 105 according to the current user alert settings 116. The alert is played via the home stereo speakers 103 in room 114 for user 102 based on the current user alert settings 116 and the location of user 102. The alert is sent to the smartphone 106 in room 112 for user 105 based on the current user alert settings 116 and the location of user 105.

The impairment profile of each user can be consistent such that if user 102 and 105 were to switch rooms, and an alarm were to be activated, each would still perceive the alarm according to their registered impairment. That is, if user 102 walked from room 114 to 112 and user 105 walked from 112 to 114, the monitoring system can track the users' movements and maintain the alert settings for each. If another notification worthy event occurred, the system would still attempt to deliver notifications based on any impairments registered of the current user in the room. If no connected components are available to provide optimal notifications, the monitoring system can compensate. One method would be for the monitoring system to create a hierarchy of alternative notifications that would still be perceivable by the user based on what connected components are available in a given room and the user's known impairments. If no connected components are available in the room at all, the monitoring system will look to rooms adjacent and activate connected components which at least partially match the user's alert settings and can prioritize those which are likely able to be perceived through walls or doorways such as audio or vibrations.

Figure 2:
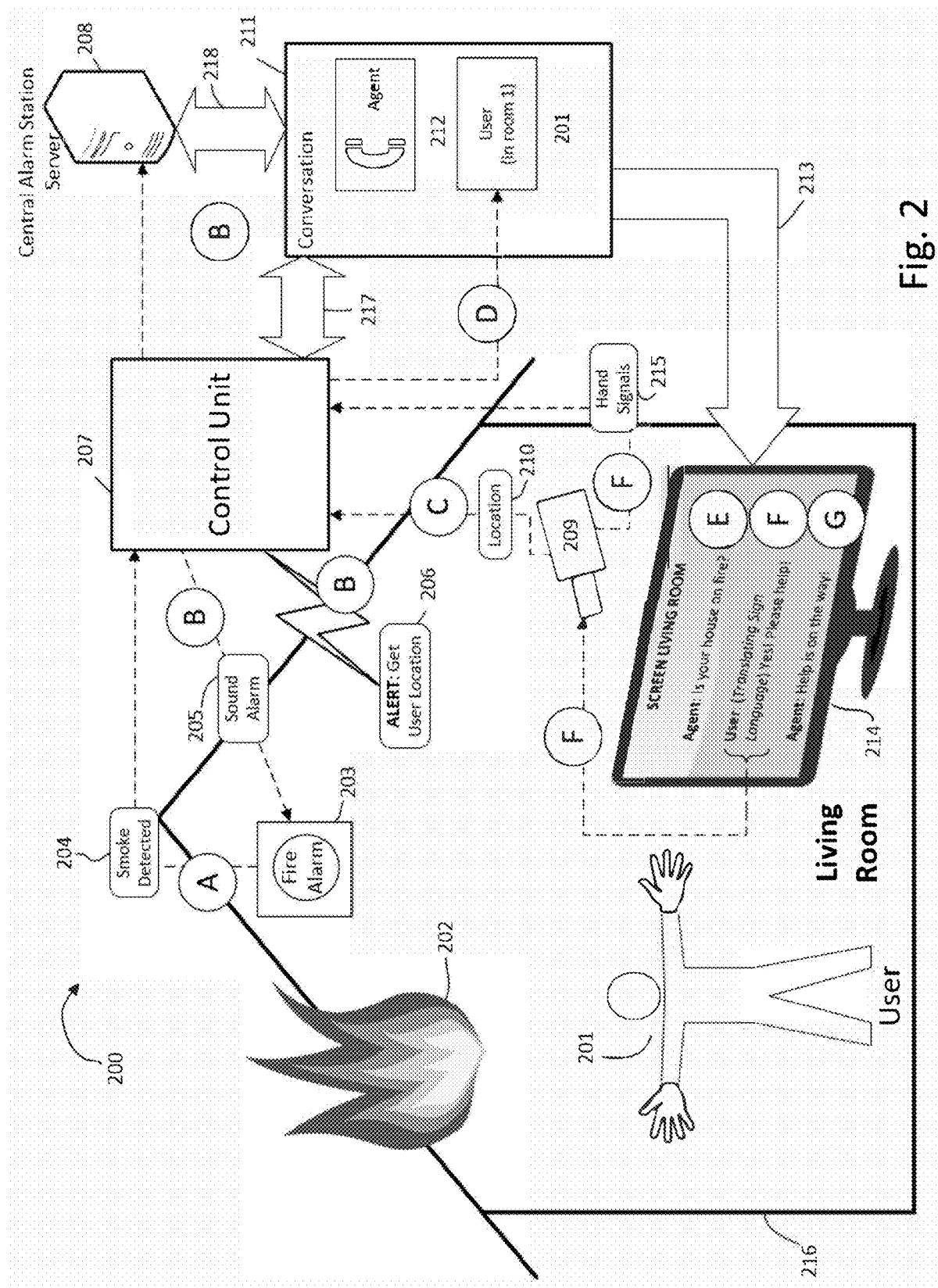
FIG. 2 is a diagram illustrating an example of a monitoring system interpreting the user.

FIG. 2 is a diagram illustrating an example of a monitoring system interpreting the user. FIG. 2 shows a house 216 with a fire 202 burning in the upper portion. Letters A, B, C, D, E, F, and G show the progression of events in FIG. 2.

The monitoring system can handle a variety of different emergency situations and is not limited to fire related incidents. Different sensors, and combinations thereof, can detect any number of different situations requiring user confirmation. For example, burglary detection could instigate control unit 207 to request confirmation from property 216 residents or other sensors in the area to confirm the validity of the incident. Flooding, or water leakage could also be a situation where validity is required. Types of situations that require user confirmation can vary depending on the sensors available to the system as well as system and user settings.

Step A in FIG. 2 shows the fire alarm 203 transferring a smoke detected signal 204 to the control unit 207.

Step B in FIG. 2 is a multi-part response by the control unit 207 from the smoke detected signal 204. Control unit 207 registers the smoke detected signal from fire alarm 203. The control unit 207 can check the validity of the alert signal from fire alarm 203, or any sensor in the monitoring system, by activating other nearby sensors, checking with known alert models, using other data, or checking directly with a user on the property. As a default for this implementation, control unit 207 signals back to fire alarm 203 to sound the alarm. Other implementations could invoke different protocols. If other sensors were around the fire, the monitoring system could potentially activate those other sensors for confirmation. Depending on the particular implementation, and the data gathered from the other sensors, this could be enough to check validity with no further need to check with a person on site. The example shown in FIG. 2 does not have any additional sensors near the fire. The control unit 207 decides, via internal logic calculation based on available input, to try to confirm the incident with a user on the property. Control unit 207 makes contact through a network connection to the central alarm station server 208. The central alarm station 208 assigns agent 212 for the conversation 211 with a user on the property. At this point, the user in conversation 211 need not be assigned previously but the control unit 207 to conversation 211 connection 217 and central alarm station server 208 to conversation 211 connection 218 can be initialized. In the example shown in FIG. 2, the determination of user 201 is made afterwards. Control unit 207 sends a signal alert 206 to the whole monitoring system 200 to return the location of a user on the property.

In some implementations, the residents of the property, or another user, can communicate with the monitoring system 200 (e.g., input data, view settings, or adjust parameters) through a physical connection, such as a touch screen or keypad, through a voice interface, video interface, and/or over a network connection. This can be to talk directly with the control unit 207 which can then make changes or gather information.

Step C in FIG. 2 shows camera 207, a connected device within the monitoring system 200, responding to the get user location alert 206 sent by control unit 207. A default alert when location is required by the monitoring system could be a smartphone notification allowing users to specify their location on the property. Depending on user settings and detected or registered impairments, these notification settings can change. In the example of FIG. 2, camera 209 shares the location 210 of user 201 with control unit 207.

In step D in FIG. 2, the control unit 207 assigns the user 201 found at location 210 to the conversation 211 with agent 212. In some implementations, an alert can be sent directly to a specific user within the sensor radius of the monitoring system 200. An example of a specific user who can be sought out would be the head of house or other caretaker responsible for the property. Other specific users can be sought out based on a number of possible parameters including but not limited to: ability, status, or condition. In some implementations, the control unit 207 can even seek out users that would be a good location to validate the particular event.

Once both the user 201 and agent 212 are in conversation 211, the validity check can begin. The signal of the agent voice is sent from the central alarm station server 208 and can be processed via control unit 207 to be heard or seen by user 201. The words of agent 212 can be auditory via a telecommunication link from the central alarm station server 208 connection 218. The words can then be played via speakers within the vicinity of location 210 for the user 201 to hear if audio processing is not a registered impairment for user 201. If hearing is a registered impairment, or user settings are not set to audio as a preference for alerts, the words spoken from agent 212 can be interpreted and shown to user 201 on a screen in the vicinity of location 210. Possible screens include but are not limited to: cellphones, smartphones, TVs, and projectors. Agent 212 can type words and have the words be displayed to user 201 in the same manner in which they were typed, on a screen or other visual device in the vicinity of location 210. Agent 212 can type words and have the words processed by a speech synthesizer. The control unit 207 can send synthesized speech to speakers in the vicinity of location 210 for user 201 to hear. Speakers can include home stereos, smartphone speakers, cellphones, landlines and anything capable of making sound. The processing of the input from agent 212, from either voice to text or text to voice or from any form understandable by the control unit 207 to any form understandable by the user 201, can be done either by the central alarm station server 208 or by control unit 207 via connections 217 and 218 depending on implementation.

Step E in FIG. 2 shows agent 212's question posed to user 201 at location 210. Agent 212 asks, "Is your house on fire?" The location 210 is the living room of house 216. The monitoring system 200 can use the location information 210 to display the text of agent 212 at a screen location that corresponds with the location data 210 sent for user 201. Screen 214 is also at location 210. If the user 201 moves rooms during the conversation, the control unit 207 can have functionality allowing the contents to appear on another screen in the room to which user 201 moves. The sensor network of monitoring system 200 can use cameras and other sensors to track the user through the property.

The process of asking a user on site whether or not a detected signal, such as the smoke detected signal 204, is accurate can be considered a user validity check. In FIG. 2, only one user validity check is performed. In other situations, the monitoring system 200 can send for multiple user validity checks. These can be staggered, for example, if a user is not able to respond others can be alerted, or they can be simultaneous depending on implementations and the specific emergency. The control unit 207 can use machine learning, algorithms or models to best choose the manner of and number of user validity checks. For example, in a time sensitive emergency, the control unit 107 may determine that simultaneously asking confirmation from multiple users is the most efficient method. In other situations, the control unit 107 may determine other solutions.

Step F in FIG. 2 is the interpretation process of user 201's response. Based on user alert settings, the control unit 207 can begin processing data from camera 209 for sign language detection. It is not a requirement for the system to be constantly parsing visual data for sign language. In some implementations, it may be more efficient to actively toggle this sign language parsing on and off. If the control unit 207 determines user 201 is likely to communicate with sign language, either through stored settings or automatic detection, then the visual analysis and parsing for sign language motion can begin. The sign language performed by user 201 gets passed as visual data from camera 209 to the control unit 207 which can use visual decoding algorithms which can include neural networks, machine learning, or other software designed to track specific parts of the body. The tracking data can be interpreted as motion and a database of known sign language signings can be used to decode the performance of user 201. The control panel 207 can interpret the signings of user 201 as text to agent 212 or voice audio. The transcription can appear on the monitor 214. The user 201 can check, and make amendments to any possible mistranslations via additional messages or explicit corrective orders as the words from specific signings are shown. Corrective orders could be a phrase or password that allows the control unit 207 to make changes. Once the conversation has begun, camera 209 and control unit can use forms of parallel processing, queues, or other software to make sure that user 201 is always being interpreted on monitor 214, or other monitors which become closer to user 201 in the case of movement between or within rooms, and that transcription is passed via control unit 207 to the agent 212 originating from the central alarm station server 208.

The communication of user 201 is translated both for the monitor viewing in user 201's presence but also for agent 212. In step G in FIG. 2, agent 212 responds to user 201's reply, which is an affirmation of the alert detected by fire alarm 203, and states that "help is on the way!" Agent 212 can alert the proper local authorities based on the situation or delegate the action to control unit 207. A signal from agent 212 to control unit 207 can be sent reporting that the user validity check confirmed a fire is burning on the property 216 and either a directive to send for local officials and emergency crew or a signal detailing who has been alerted.

The agent's language in later messages does not need to be in the same form as prior messages. Agents could even speak different languages and rely on translation networks within the monitoring system 200 to decode the message properly for the understandability of user 201. The agent 212 can alternate between textual response and audio, or different languages. The control unit 207 can switch interpretation based on the input it receives and what the required output is based on the situation. In this way, the monitoring system 200 can manage a variety of communication between parties which don't communicate in the same manner either due to language, impairment, or other reasons. The input received can be either programmed beforehand or detected during interpretation. The output expected can be either programmed beforehand using sensor data or user preferences or detected during interpretation.

FIG. 2 illustrates an example of sign language but other impairments are possible as well as other implementations. The same technology of transcribing text to audio, audio to text, sign language to text or audio, as well as language translation, should be considered both within cases of emergency alert checks like the fire 202 shown in FIG. 2 but also other situations. For example, the same interpretation mechanism could allow the user 201 to use sign language for a package delivery man or visitor. If the user is within the sensor range of the monitoring system 200, they can be interpreted to other languages either to remote locations via network or locally to visitors or other residents of the property. For example, the monitoring system 200 could use control unit 207 to help user 201 use sign language to communicate with a local police department either on the phone or in person on the property. The monitoring system 200 could use control unit 207 to help user 201 use sign language to communicate with family, friends, strangers, or acquaintances on the telephone or other long range communication devices. If user 201 suffered from blindness, text communication could be interpreted by the monitoring system 200 via control unit 207 and used both remotely and locally as well. The monitoring system can also aid language barriers between non-impaired persons. The monitoring system 200 could use control unit 207 to translate language in real time. Language translation could be used in conjunction with impairment settings.

Figure 3:
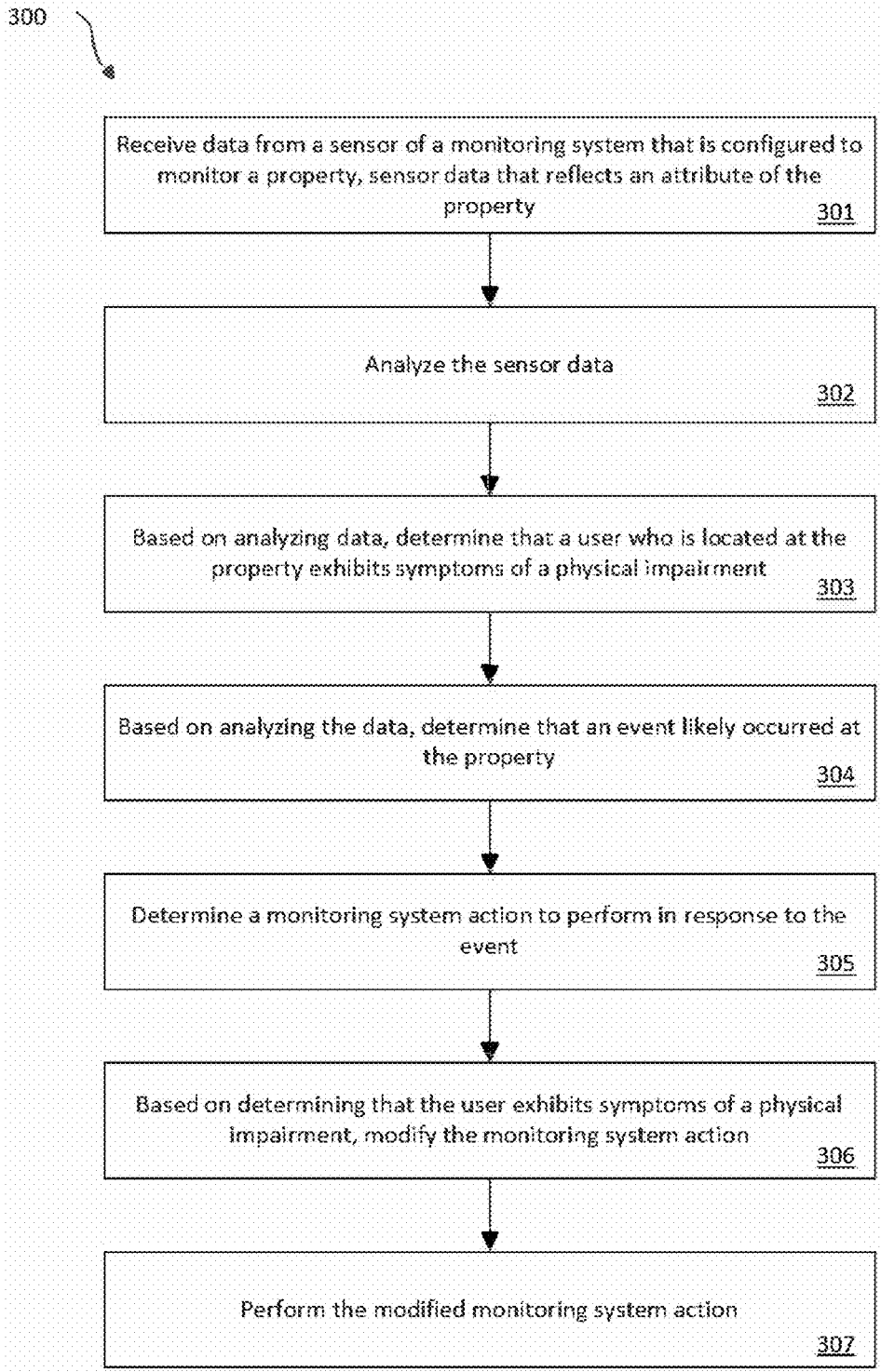
FIG. 3 is a flow chart illustrating an example of a method for monitoring system actions based on impairment detection.

FIG. 3 is a flowchart illustrating an example of a method 300 for performing monitoring system actions related to impairment detection. Method 300 can be performed by one or more electronic systems, for example, the monitoring system 111 of FIG. 1 and/or one or more of the components of the monitoring system 400 of FIG. 4. Briefly, method 300 includes receiving data from a sensor of a monitoring system that is configured to monitor a property, sensor data that reflects an attribute of the property (301); analyzing the sensor data (302); based on analyzing the data, determining that a user who is located at the property exhibits symptoms of a physical impairment (303); based on analyzing the data, determining that an event likely occurred at the property (304); determining a monitoring system action to perform in response to the event (305); based on determining that the user exhibits symptoms of a physical impairment, modifying the monitoring system action (306); performing the modified monitoring system action (307).

In more detail, the monitoring system composed of one or more connected components, receives data from the one or more connected components via a form of a network (301). Depending on implementations, the reception of data can take place on either wireless or wired networks and involve various protocols. For example, the monitoring system 111 receives data from the sensors 101 and 104 over the network 110. In the example of FIG. 1, the sensors 101 and 104 collect visual data and send the visual data to the monitoring system 111 over the network 110. In some implementations, other forms of data are collected by the sensors 101 and 104 from the property 109. For example, the sensors 101 and 104 can collect audio data, vibrational data, or any other data that can be used to determine impairments of users within a sensing distance of the sensors 101 and 104.

The server or other computer system analyzes the sensor data (302). In some implementations, the system can process data via a number of computational methods including but not limited to machine learning, algorithms, models, connected databases as well as various combinations of computational techniques. For example, in the case where the monitoring system 111 receives visual data from sensors such as the sensors 101 and 104, image analysis can be performed. In the example of FIG. 1, image analysis performed by the monitoring system can be performed based on the data from the sensor 101. In this case, the data from the sensor 101 shows a white cane moving back and forth in front of user 102. The monitoring system 111 can match this analysis with existing data such as existing data of known impairments. If the analyzed data from the sensor 101 matches existing data of a known impairment, the monitoring system 111 can determine that the user 102 exhibits symptoms, and therefore likely suffers from, the known impairment. A degree of matching can be used to determine the likelihood that the user 102 is affected by the known impairment. In some cases, if the degree of matching is low, the monitoring system 111 can determine that a monitoring system action should not be modified as the user 102 is likely not affected by the known impairment. If the degree of matching or multiple degrees of matching representing multiple impairments satisfy a threshold, the monitoring system 111 can determine that a monitoring system action should be modified as the user 102 is likely affected by the known impairment or impairments.

The monitoring system summarily determines that user 102 is blind. In the same manner, sensor 104 passes data via the network 110. The network 110 is able to transfer the data to the algorithms within the monitoring system. Within the monitoring system, a determination is made that the data related to user 105 corresponds with known characteristics. The monitoring system determines that user 105 does not have any impairment. This determination can be made by matching visual, motion and other sensor data to known characteristics which correspond with known impairments. The walking motion, gait, and step frequency correspond to known data of non-impaired persons. The monitoring system infers from the sensor 104 data that user 105 likely experiences no impairments.

Based on analyzing the data, the system can determine that a user who is located at the property exhibits symptoms of a physical impairment (303). For example, as a result of the data analysis or as an aspect within the analysis, a system, such as the monitoring system 111, can compare the data obtained from the sensors 101 and 104 to known outward effects, visual cues and other data sources. The data obtained from sensors, such as the sensors 101 and 104, that is used to detect an impairment need not be visual. Any data from a single, or collection of, connected sensor(s) can be used to make a determination.

In some implementations, when a match is made between analyzed sensor data and known symptoms of an impairment or multiple impairments, the system determines that the specific user currently has the corresponding impairment or impairments and saves the data via a setting which can be used in other aspects of the system. Multiple impairment detections can take place either simultaneously or in succession. For example, the monitoring system 111 can generate a degree of matching that can be used to determine the likelihood that the user 102 is affected by a known impairment. In some cases, if the degree of matching is low, the monitoring system 111 can determine that a monitoring system action should not be modified as the user 102 is likely not affected by the known impairment. If the degree of matching or multiple degrees of matching representing multiple impairments satisfy a threshold, the monitoring system 111 can determine that a monitoring system action should be modified as the user 102 is likely affected by the known impairment or impairments.

In some implementations, the data received from the sensor of the monitoring system is compared to known impairments. For example, in order to determine that the user 102 located at the property 109 exhibits symptoms of the impairment, the system 111 of FIG. 1 can compare the data received from the sensor 101 to data of known impairments. The system 111 can compare the data received from the sensor 101 to one or more known impairments until the system 111 identifies a match between the data received from the sensor 101 and at least one of the one or more known impairments. For example, the data received from the sensor 101 can include visual data of the user 102 walking and holding a white cane. The visual data of the data received from the sensor 101 can be used to generate one or more processing results that represent one or more features of the data received from the sensor 101. For example, the system 111 can generate a gait profile of the user 102 based on the data received from the sensor 101. The gait profile of the user 102 can be compared to other gait profiles of one or more other real or computer generated examples that are known to have impairments. In the example of FIG. 1, the gait profile of the user 102 matches another gait profile of one or more other real or computer generated examples associated with a seeing impairment. For example, the gait profile may include indicators that can be interpreted as hesitant, slow moving, or the like that match at least one gait profile of one or more other real or computer generated examples associated with a seeing impairment.

In some implementations, the visual data of the data received from the sensor 101 is used to detect features of the user 102. The detected features can be compared to other features corresponding to known impairments. A system, such as the system 111, can generate a likelihood that a user exhibits symptoms of a given impairment. The likelihood that a user exhibits symptoms of a given impairment, in some cases, can be based on comparing the detected features of the user 102 to the other features corresponding to known impairments. For example, the visual data of the data received from the sensor 101 can be used to detect the white cane of the user 102. The instance of the white cane in the visual data of the data received from the sensor 101 can be recorded and other instances of white canes can be used to determine, based on the impairments corresponding to the other instances of white canes, what likely impairments correspond to the user 102 based on the data received from the sensor 101. Likely impairments can include one or more impairments ranked based on likelihood. Subsequent modifications of system actions can be determined based on one or more impairments that are most likely out of one or more determined matching impairments.

In some implementations, a machine learning model is used to determine that the user located at the property exhibits symptoms of a physical impairment. For example, a machine learning model can be trained using one or more training samples of one or more instances of users with impairments. The one or more training samples can be labeled corresponding to what impairment or impairments a given user in a given training sample exhibits. The machine learning model can be trained to associate one or more features of input data with a particular impairment such that when subsequent input data is provided to the trained machine learning model, the trained machine learning model can determine, based on the subsequent input data, that one or more users of the subsequent input data exhibit symptoms of a given impairment.

In some implementations, an impairment profile corresponding to the user is updated based on determining that the user located at the property exhibits symptoms of the impairment. For example, each user of one or more users at a property or recognized by a system such as the system 111, can be associated with an impairment profile. A system, such as the system 111, can be used to store and update one or more of the impairment profiles associated with the one or more users at a property or recognized by a given system. The system can recognize a given user at a specific location and use a corresponding impairment profile to communicate with the user. Communications or alert methods performed by the system with the user may include providing the user with information or soliciting information from the user. The impairment profile can be used to track the user through a system or property such that the user is appropriately addressed by the system through system actions such as monitoring system actions given information included in the impairment profile. For example, the user 102 can be associated with a first impairment profile. After determining that the user 102 exhibits symptoms of a seeing impairment, the system 111 can update the first impairment profile such that subsequent system interactions with the user 102 can be performed using actions that can be recognized by the user 102 given the seeing impairment. For example, emergency alerts can be issued via audio instead of visually.

Based on analyzing the data, the system can determine that an event likely occurred at the property (304). For example, the sensor 101, or another sensor located at or near the property 109 can capture data of the property 109. In the case where the sensor 101 captures visual data, the data, when analyzed by a system, such as the monitoring system 111, can show visual symbols, movement or other situational information which corresponds with known visual symbols, movement or other situational information. In some implementations, analyzed data corresponding with prestored data is used to determine a likelihood of an event. For example, by comparing visual symbols, movement or other situational information from the sensor 101 to known visual symbols, movement or other situational information of a robber lurking in the backyard, a system, such as the monitoring system 111 can determine that a robber is likely lurking in the backyard. In some cases, this situation could be considered an event by the monitoring system 111. Of course, other possible events, such as the event of the package 108 delivery of FIG. 1, can also be considered and treated as an event. Any other notable circumstance or action at or affecting the property 109, such as events near or within a certain vicinity of the property 109, can be an event depending on implementation.

In some implementations, the data used to detect an event is not visual. Any data from a single, or collection of, connected sensor(s) can be used to make a determination. Other events can also be processed including but not limited to knocks on the front door, package delivery, driveway intrusion, house fire, or carbon monoxide. Multiple event detections can take place either simultaneously or in succession. Confirmation of events could take place with a user on site or via additional sensors on the property. The monitoring system can collect additional data to further inform an event determination if required.

The system determines a monitoring system action to perform in response to the event (305). For example, the monitoring system 111 can use data pertaining to users, such as the user 102 and the user 105 along with the property 109 together with various computational techniques to determine an action to perform in response to an event. The corresponding action to perform in response to the event can depend on the event and the property at which the event occurred. The monitoring system 111 can determine a given monitoring system action based on system logic or user preference or a combination of both. An example of a system action to perform in response to an event would be to call the fire department based on the event of a fire, or notify users of a package delivery as shown in the examples of FIG. 1 and FIG. 2, respectively.

Based on determining that the user exhibits symptoms of a physical impairment, the system can modify the monitoring system action (306). For example, the monitoring system 111 can use machine learning, models, database searching or other computational processes to determine which alert method corresponding to a monitoring system action would be appropriate depending on the specific physical impairment, or impairments, of a given user such as the user 102 or the user 105. For example, a notification sent to all users in the house may be processed differently for a user, such as the user 102 of FIG. 1, who is blind compared to a user, such as the user 105 of FIG. 1, who is not blind. For the user 102, the monitoring system 111 can modify the notification to be delivered via audio instead of visually. For other impairments, the monitoring system can similarly modify a given monitoring system action. For example, the monitoring system 111 can modify notifications to be sent visually or via vibrations for deaf users. Combinations of multiple different notification methods can be used. Notification methods can also be changed via user preferences. Notification methods can be added or subtracted depending on particular implementations and the components available on the property.

In some implementations, an impairment profile is used to modify a monitoring system action. For example, the impairment profile of the user 102 can include one or more likely impairments including a seeing impairment. The system 111 can use the impairment profile of the user 102 to modify alerts or other interactions with the system 111 such that non-visually based components are preferred over visually based components. For example, a security alert message from the system 111 can be read aloud to the user 102 when the system 111 detects that the user 102 is in a predetermined vicinity of an audio enabled connected component. For a user that does not have a seeing impairment, such as the user 105, the same security alert message may be displayed visually on a mobile device of the user 105 or another visually based connected component of the system 111.

In some implementations, modifying the monitoring system action includes determining the impairment exhibited by the user affects a human sense of the user. Human senses can include any method of perception by a user, e.g., taste, sight, touch, smell, or sound. Based on determining the impairment exhibited by the user affects a given human sense, a system, such as the system 111, can determine if any alert method or system communication of a given monitoring system action relies on the given human sense of the user in order to be perceived by the user. For example, an alert message displayed on a television set that is part of a monitoring system action can require the human sense of sight in order to be perceived by the user. The system 111 can determine that the monitoring system action is configured to be perceived by the human sense of sight. The system 111 can determine either by actively capturing data of the user that the user has a seeing impairment or can reference a stored impairment profile corresponding to the user in order to determine that the user likely has an impairment that affects the human sense of sight.

The system 111 can then determine a second available alert method configured to be perceived by another human sense and that can be used to carry out at least part of the monitoring system action. For example, the system 111 can determine that a speaker is in the vicinity of the user and is available and authorized to be used for an alert. The system 111 can determine that the user does not have any impairment that would affect the perception of the audio alert. The system 111 can then initiate the audio alert. In this way, the system 111 can modify the original monitoring system action that included a reliance on the human sense of sight based on a determination that the impairment of the user could lead to the user having issues perceiving the monitoring system action. Second available alert methods can be chosen based on a likelihood that a given user is able to perceive the alert based on known impairments and what connected components are near the given user. In some cases, one or more alert methods can be ranked according to a likelihood that a given user is able to perceive a given alert based on known impairments and what connected components are near the given user.

In some implementations, a hierarchy is used to modify the monitoring system action. For example, the system 111 can have a number of connected components on a given property. To communicate, alert, or otherwise provide information to a user at the given property, the system 111 can determine what connected components near the user at the given property are able to be perceived by the user. For example, in some cases, the system 111 creates a hierarchy of monitoring system actions. The hierarchy of monitoring system actions can include modifications of a given monitoring system action. For example, a first monitoring system action can include alerting a user of a package arrival using a visual notification on a mobile device of the user. A modified version of the first monitoring system action within the hierarchy of monitoring system actions can include alerting the user of the package arrival using audio speakers. Based on the location of the user and the status of one or more connected components on a given property, the system 111 can generate a hierarchy between the two or more monitoring system actions including the first monitoring system action and the modified first monitoring system action.

In situations where only one monitoring system action is available, the system 111 can use the single monitoring system action or initiate subsequent processes, e.g., alerting authorities. The system 111 can prioritize the first monitoring system action if a mobile device or other visually connected component is within the vicinity of the user, is operational, and the user does not have an impairment that would make the perception of the visual alert of the first monitoring system action unsuccessful. The system 111 can prioritize the modified first monitoring system action if a visually connected component is not within the vicinity of the user, a visually connected component is not operational, or the user has an impairment that would make the perception of the visual alert of the first monitoring system action unsuccessful. Multiple monitoring system actions can be prioritized based on proximity of relevant connected components to a user, operational status of the connected components including location, impairments of the user obtained from analysis or impairment profile, user settings or preferences, or priority of alert.

In some implementations, monitoring system actions of a hierarchy of monitoring system actions correspond to values. For example, for each monitoring system action of the monitoring system actions of the hierarchy of monitoring system actions, a value can be generated that represents at least one or more of the following items: statuses of connected components including proximity, system settings, impairments of a user, impairment profile information, historical data of the system. For example, in some cases, if a monitoring system action relies on a given connected component but that connected component is not in the vicinity of the user, e.g., in a room adjacent to a room of a property occupied by the user but not in the room occupied by the user, that monitoring system action can be associated with a value that makes it less optimal, all other items being equal, than a monitoring system action that relies on given connected component located in the room occupied by the user. In some cases, less optimal can correspond to a numerical value that is less than a first numerical value.

In general, any ranking, e.g., ascending or descending, can be used to generate the hierarchy of monitoring system actions. In some cases, if two monitoring system actions rely on two separate connected components that are both not in the room occupied by the user, subsequent numerical values can be generated to favor the monitoring system action corresponding to the connected component that is more close, determined by distance measurement, to the user or the connected component that is more easily perceived by the user even while not in the same room, e.g., speakers. In some cases, a given monitoring system action is chosen over another monitoring system action only if a value corresponding to the given monitoring system action is more than a threshold difference from a value corresponding to the other monitoring system action. For example, a given monitoring system action might have to be 20 points above another monitoring system action to be chosen instead of the other monitoring system action. Otherwise, further determination including other items processing may be required. In some cases, features of both the given monitoring system action and the other monitoring system action, such as alert methods, may both be used if the given monitoring system action does not satisfy the difference threshold, e.g., 20 points of difference.

In some implementations, the values of the monitoring system actions are weighted sums of a plurality of items. For example, values representing the items, e.g., statuses of connected components including proximity, system settings, impairments of a user, impairment profile information, and historical data of the system, can be weighted before being summed together to generate a value for a corresponding monitoring system action. The weighting or other calculation method of a system using items such as the items mentioned above, can be changed based on system settings or informed by other processing modules such as machine learning models that are trained to determine which monitoring system action of a group of two or more monitoring system actions is most likely to be perceived. The weighting or other calculation methods to determine the values of the monitoring system actions can be configured such that the monitoring system action most likely to be perceived is chosen over other monitoring system actions that are less likely to be perceived by a given user.

In some implementations, the priority of an event is used to determine modifications to the monitoring system action. High priority events that, depending on implementation, can include fires, as shown in FIG. 2, as well as life threatening or otherwise more serious events, can be used to determine modifications to the monitoring system action. For example, in the case of a fire as shown in FIG. 2, a system can determine to send out multiple alerts depending on impairments of one or more users at the property or connected component statuses. In some implementations, a system can determine a hierarchy of monitoring system actions that include a plurality of alert or other communication methods. Instead of modifying a given monitoring system action to include a most appropriate alert method, in the case of a high priority event or other system defined situation, the system can two or more alert methods within the given monitoring system action. In this way, the system can increase the likelihood that the user is made aware of the given high priority event.

In some implementations, two or more alert methods are used within a monitoring system action. For example, a monitoring system action that includes alerting a user of a package can include alerting the user both visually using a visually based connected component, e.g., mobile device, as well as with an audio alert using an audio based connected component, e.g., speakers. In some implementations, more than one alert method can be used in cases where user preferences or settings are configured such that the system chooses specific alert methods for a given monitoring system action, a hierarchy of monitoring system actions does not find a single alert method that is sufficiently above one or more other alert methods, an event is of a priority where two or more alert methods are authorized.

The system performs the modified monitoring system action (307). For example, as shown in FIG. 1, the monitoring system 111, after detecting the event of the delivery of the package 108, can alert the user 102 with an auditory alert played on a connected component, such as the speakers 103 in the room 114. The user 102 in the room 114 is alerted with an audio alert because the monitoring system 111 has determined that the user 102 is affected by a sight impairment. The monitoring system 111 determines that an alternative notification method for users with such a sight impairment within the property 109 and specifically within the room 114 with the speakers 103 is an audio alert played over the speakers 103. For the user 105 who is not affected by a sight impairment, the monitoring system 111 can configure an alert for the same event to be sent to the smartphone 106 in the room 112 for the user 105 based on the current user alert settings 116 and the location of the user 105. The performance of a given monitoring system action, including one or more alert methods, can be accomplished by any connected component, or combination of connected components such as the speakers 103 or the smartphone 106, within a system such as the monitoring system 111.

Figure 4:
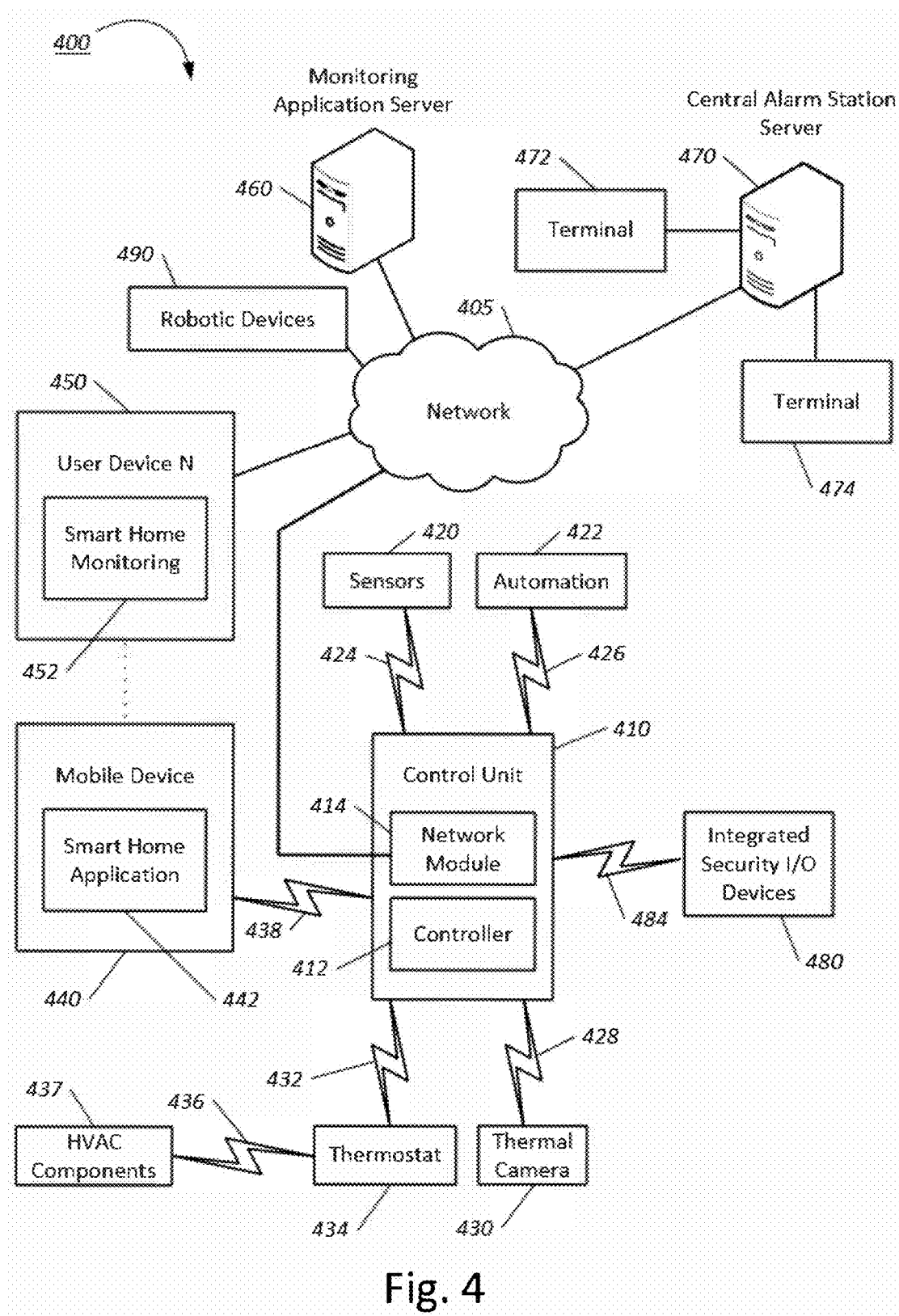
FIG. 4 is a diagram illustrating an example of a property monitoring system.

FIG. 4 is a diagram illustrating an example of a property monitoring system. The network 405 is configured to enable exchange of electronic communications between devices connected to the network 405. For example, the network 405 may be configured to enable exchange of electronic communications between the control unit 410, the one or more user devices 440 and 450, the monitoring server 460, and the central alarm station server 470. The network 405 may include, for example, one or more of the Internet, Wide Area Networks (WANs), Local Area Networks (LANs), analog or digital wired and wireless telephone networks (e.g., a public switched telephone network (PSTN), Integrated Services Digital Network (ISDN), a cellular network, and Digital Subscriber Line (DSL)), radio, television, cable, satellite, or any other delivery or tunneling mechanism for carrying data. The network 405 may include multiple networks or subnetworks, each of which may include, for example, a wired or wireless data pathway. The network 405 may include a circuit-switched network, a packet-switched data network, or any other network able to carry electronic communications (e.g., data or voice communications). For example, the network 405 may include networks based on the Internet protocol (IP), asynchronous transfer mode (ATM), the PSTN, packet-switched networks based on IP, X.25, or Frame Relay, or other comparable technologies and may support voice using, for example, VoIP, or other comparable protocols used for voice communications. The network 405 may include one or more networks that include wireless data channels and wireless voice channels. The network 405 may be a wireless network, a broadband network, or a combination of networks including a wireless network and a broadband network.

The control unit 410 includes a controller 412 and a network module 414. The controller 412 is configured to control a control unit monitoring system (e.g., a control unit system) that includes the control unit 410. In some examples, the controller 412 may include a processor or other control circuitry configured to execute instructions of a program that controls operation of a control unit system. In these examples, the controller 412 may be configured to receive input from sensors, flow meters, or other devices included in the control unit system and control operations of devices included in the household (e.g., speakers, lights, doors, etc.). For example, the controller 412 may be configured to control operation of the network module 414 included in the control unit 410.

The network module 414 is a communication device configured to exchange communications over the network 405. The network module 414 may be a wireless communication module configured to exchange wireless communications over the network 405. For example, the network module 414 may be a wireless communication device configured to exchange communications over a wireless data channel and a wireless voice channel. In this example, the network module 414 may transmit alarm data over a wireless data channel and establish a two-way voice communication session over a wireless voice channel. The wireless communication device may include one or more of a LTE module, a GSM module, a radio modem, cellular transmission module, or any type of module configured to exchange communications in one of the following formats: LTE, GSM or GPRS, CDMA, EDGE or EGPRS, EV-DO or EVDO, UMTS, or IP.

The network module 414 also may be a wired communication module configured to exchange communications over the network 405 using a wired connection. For instance, the network module 414 may be a modem, a network interface card, or another type of network interface device. The network module 414 may be an Ethernet network card configured to enable the control unit 410 to communicate over a local area network and/or the Internet. The network module 414 also may be a voice band modem configured to enable the alarm panel to communicate over the telephone lines of Plain Old Telephone Systems (POTS).

The control unit system that includes the control unit 410 includes one or more sensors 420. For example, the monitoring system may include multiple sensors 420. The sensors 420 may include a lock sensor, a contact sensor, a motion sensor, or any other type of sensor included in a control unit system. The sensors 420 also may include an environmental sensor, such as a temperature sensor, a water sensor, a rain sensor, a wind sensor, a light sensor, a smoke detector, a carbon monoxide detector, an air quality sensor, etc. The sensors 420 further may include a health monitoring sensor, such as a prescription bottle sensor that monitors taking of prescriptions, a blood pressure sensor, a blood sugar sensor, a bed mat configured to sense presence of liquid (e.g., bodily fluids) on the bed mat, etc. In some examples, the health monitoring sensor can be a wearable sensor that attaches to a user in the home. The health monitoring sensor can collect various health data, including pulse, heart-rate, respiration rate, sugar or glucose level, bodily temperature, or motion data.

The sensors 420 can also include a radio-frequency identification (RFID) sensor that identifies a particular article that includes a pre-assigned RFID tag.

The system 400 also includes one or more thermal cameras 430 that communicate with the control unit 410. The thermal camera 430 may be an IR camera or other type of thermal sensing device configured to capture thermal images of a scene. For instance, the thermal camera 430 may be configured to capture thermal images of an area within a building or home monitored by the control unit 410. The thermal camera 430 may be configured to capture single, static thermal images of the area and also video thermal images of the area in which multiple thermal images of the area are captured at a relatively high frequency (e.g., thirty images per second). The thermal camera 430 may be controlled based on commands received from the control unit 410. In some implementations, the thermal camera 430 can be an IR camera that captures thermal images by sensing radiated power in one or more IR spectral bands, including NIR, SWIR, MWIR, and/or LWIR spectral bands.

The thermal camera 430 may be triggered by several different types of techniques. For instance, a Passive Infra-Red (PIR) motion sensor may be built into the thermal camera 430 and used to trigger the thermal camera 430 to capture one or more thermal images when motion is detected. The thermal camera 430 also may include a microwave motion sensor built into the camera and used to trigger the thermal camera 430 to capture one or more thermal images when motion is detected. The thermal camera 430 may have a "normally open" or "normally closed" digital input that can trigger capture of one or more thermal images when external sensors (e.g., the sensors 420, PIR, door/window, etc.) detect motion or other events. In some implementations, the thermal camera 430 receives a command to capture an image when external devices detect motion or another potential alarm event. The thermal camera 430 may receive the command from the controller 412 or directly from one of the sensors 420.

In some examples, the thermal camera 430 triggers integrated or external illuminators (e.g., Infra-Red or other lights controlled by the property automation controls 422, etc.) to improve image quality. An integrated or separate light sensor may be used to determine if illumination is desired and may result in increased image quality.

The thermal camera 430 may be programmed with any combination of time/day schedules, monitoring system status (e.g., "armed stay," "armed away," "unarmed"), or other variables to determine whether images should be captured or not when triggers occur. The thermal camera 430 may enter a low-power mode when not capturing images. In this case, the thermal camera 430 may wake periodically to check for inbound messages from the controller 412. The thermal camera 430 may be powered by internal, replaceable batteries if located remotely from the control unit 410. The thermal camera 430 may employ a small solar cell to recharge the battery when light is available. Alternatively, the thermal camera 430 may be powered by the controller's 412 power supply if the thermal camera 430 is co-located with the controller 412.

In some implementations, the thermal camera 430 communicates directly with the monitoring server 460 over the Internet. In these implementations, thermal image data captured by the thermal camera 430 does not pass through the control unit 410 and the thermal camera 430 receives commands related to operation from the monitoring server 460.

In some implementations, the system 400 includes one or more visible light cameras, which can operate similarly to the thermal camera 430, but detect light energy in the visible wavelength spectral bands. The one or more visible light cameras can perform various operations and functions within the property monitoring system 400. For example, the visible light cameras can capture images of one or more areas of the property, which the cameras, the control unit 110, and/or another computer system of the monitoring system 400 can process and analyze.

The system 400 also includes one or more property automation controls 422 that communicate with the control unit 110 to perform monitoring. The property automation controls 422 are connected to one or more devices connected to the system 400 and enable automation of actions at the property. For instance, the property automation controls 422 may be connected to one or more lighting systems and may be configured to control operation of the one or more lighting systems. Also, the property automation controls 422 may be connected to one or more electronic locks at the property and may be configured to control operation of the one or more electronic locks (e.g., control Z-Wave locks using wireless communications in the Z-Wave protocol). Further, the property automation controls 422 may be connected to one or more appliances at the property and may be configured to control operation of the one or more appliances. The property automation controls 422 may include multiple modules that are each specific to the type of device being controlled in an automated manner. The property automation controls 422 may control the one or more devices based on commands received from the control unit 410. For instance, the property automation controls 422 may interrupt power delivery to a particular outlet of the property or induce movement of a smart window shade of the property.

The system 400 also includes thermostat 434 to perform dynamic environmental control at the property. The thermostat 434 is configured to monitor temperature and/or energy consumption of an HVAC system associated with the thermostat 434, and is further configured to provide control of environmental (e.g., temperature) settings. In some implementations, the thermostat 434 can additionally or alternatively receive data relating to activity at the property and/or environmental data at the home, e.g., at various locations indoors and outdoors at the property. The thermostat 434 can directly measure energy consumption of the HVAC system associated with the thermostat, or can estimate energy consumption of the HVAC system associated with the thermostat 434, for example, based on detected usage of one or more components of the HVAC system associated with the thermostat 434. The thermostat 434 can communicate temperature and/or energy monitoring information to or from the control unit 410 and can control the environmental (e.g., temperature) settings based on commands received from the control unit 410.

In some implementations, the thermostat 434 is a dynamically programmable thermostat and can be integrated with the control unit 410. For example, the dynamically programmable thermostat 434 can include the control unit 410, e.g., as an internal component to the dynamically programmable thermostat 434. In addition, the control unit 410 can be a gateway device that communicates with the dynamically programmable thermostat 434. In some implementations, the thermostat 434 is controlled via one or more property automation controls 422.

In some implementations, a module 437 is connected to one or more components of an HVAC system associated with the property, and is configured to control operation of the one or more components of the HVAC system. In some implementations, the module 437 is also configured to monitor energy consumption of the HVAC system components, for example, by directly measuring the energy consumption of the HVAC system components or by estimating the energy usage of the one or more HVAC system components based on detecting usage of components of the HVAC system. The module 437 can communicate energy monitoring information and the state of the HVAC system components to the thermostat 434 and can control the one or more components of the HVAC system based on commands received from the thermostat 434.

In some examples, the system 400 further includes one or more robotic devices 490. The robotic devices 490 may be any type of robot that are capable of moving and taking actions that assist in home monitoring. For example, the robotic devices 490 may include drones that are capable of moving throughout a property based on automated control technology and/or user input control provided by a user. In this example, the drones may be able to fly, roll, walk, or otherwise move about the property. The drones may include helicopter type devices (e.g., quad copters), rolling helicopter type devices (e.g., roller copter devices that can fly and/or roll along the ground, walls, or ceiling) and land vehicle type devices (e.g., automated cars that drive around a property). In some cases, the robotic devices 490 may be robotic devices 490 that are intended for other purposes and merely associated with the system 400 for use in appropriate circumstances. For instance, a robotic vacuum cleaner device may be associated with the monitoring system 400 as one of the robotic devices 490 and may be controlled to take action responsive to monitoring system events.

In some examples, the robotic devices 490 automatically navigate within a property. In these examples, the robotic devices 490 include sensors and control processors that guide movement of the robotic devices 490 within the property. For instance, the robotic devices 490 may navigate within the property using one or more cameras, one or more proximity sensors, one or more gyroscopes, one or more accelerometers, one or more magnetometers, a global positioning system (GPS) unit, an altimeter, one or more sonar or laser sensors, and/or any other types of sensors that aid in navigation about a space. The robotic devices 490 may include control processors that process output from the various sensors and control the robotic devices 490 to move along a path that reaches the desired destination and avoids obstacles. In this regard, the control processors detect walls or other obstacles in the property and guide movement of the robotic devices 490 in a manner that avoids the walls and other obstacles.

In addition, the robotic devices 490 may store data that describes attributes of the property. For instance, the robotic devices 490 may store a floorplan of a building on the property and/or a three-dimensional model of the property that enables the robotic devices 490 to navigate the property. During initial configuration, the robotic devices 490 may receive the data describing attributes of the property, determine a frame of reference to the data (e.g., a property or reference location in the property), and navigate the property based on the frame of reference and the data describing attributes of the property. Further, initial configuration of the robotic devices 490 also may include learning of one or more navigation patterns in which a user provides input to control the robotic devices 490 to perform a specific navigation action (e.g., fly to an upstairs bedroom and spin around while capturing video and then return to a home charging base). In this regard, the robotic devices 490 may learn and store the navigation patterns such that the robotic devices 490 may automatically repeat the specific navigation actions upon a later request.

In some examples, the robotic devices 490 may include data capture and recording devices. In these examples, the robotic devices 490 may include one or more cameras, one or more motion sensors, one or more microphones, one or more biometric data collection tools, one or more temperature sensors, one or more humidity sensors, one or more air flow sensors, and/or any other types of sensors that may be useful in capturing monitoring data related to the property and users at the property. The one or more biometric data collection tools may be configured to collect biometric samples of a person in the property with or without contact of the person. For instance, the biometric data collection tools may include a fingerprint scanner, a hair sample collection tool, a skin cell collection tool, and/or any other tool that allows the robotic devices 490 to take and store a biometric sample that can be used to identify the person (e.g., a biometric sample with DNA that can be used for DNA testing).

In some implementations, one or more of the thermal cameras 430 may be mounted on one or more of the robotic devices 490.

In some implementations, the robotic devices 490 may include output devices. In these implementations, the robotic devices 490 may include one or more displays, one or more speakers, and/or any type of output devices that allow the robotic devices 490 to communicate information to a nearby user.

The robotic devices 490 also may include a communication module that enables the robotic devices 490 to communicate with the control unit 410, each other, and/or other devices. The communication module may be a wireless communication module that allows the robotic devices 490 to communicate wirelessly. For instance, the communication module may be a Wi-Fi module that enables the robotic devices 490 to communicate over a local wireless network at the property. The communication module further may be a 900 MHz wireless communication module that enables the robotic devices 490 to communicate directly with the control unit 410. Other types of short-range wireless communication protocols, such as Bluetooth, Bluetooth LE, Z-wave, Zigbee, etc., may be used to allow the robotic devices 490 to communicate with other devices in the property. In some implementations, the robotic devices 490 may communicate with each other or with other devices of the system 400 through the network 405.

The robotic devices 490 further may include processor and storage capabilities. The robotic devices 490 may include any suitable processing devices that enable the robotic devices 490 to operate applications and perform the actions described throughout this disclosure. In addition, the robotic devices 490 may include solid state electronic storage that enables the robotic devices 490 to store applications, configuration data, collected sensor data, and/or any other type of information available to the robotic devices 490.

The robotic devices 490 can be associated with one or more charging stations. The charging stations may be located at predefined home base or reference locations at the property. The robotic devices 490 may be configured to navigate to the charging stations after completion of tasks needed to be performed for the monitoring system 400. For instance, after completion of a monitoring operation or upon instruction by the control unit 410, the robotic devices 490 may be configured to automatically fly to and land on one of the charging stations. In this regard, the robotic devices 490 may automatically maintain a fully charged battery in a state in which the robotic devices 490 are ready for use by the monitoring system 400.

The charging stations may be contact-based charging stations and/or wireless charging stations. For contact-based charging stations, the robotic devices 490 may have readily accessible points of contact that the robotic devices 490 are capable of positioning and mating with a corresponding contact on the charging station. For instance, a helicopter type robotic device 490 may have an electronic contact on a portion of its landing gear that rests on and mates with an electronic pad of a charging station when the helicopter type robotic device 490 lands on the charging station. The electronic contact on the robotic device 490 may include a cover that opens to expose the electronic contact when the robotic device 490 is charging and closes to cover and insulate the electronic contact when the robotic device is in operation.

For wireless charging stations, the robotic devices 490 may charge through a wireless exchange of power. In these cases, the robotic devices 490 need only locate themselves closely enough to the wireless charging stations for the wireless exchange of power to occur. In this regard, the positioning needed to land at a predefined home base or reference location in the property may be less precise than with a contact based charging station. Based on the robotic devices 490 landing at a wireless charging station, the wireless charging station outputs a wireless signal that the robotic devices 490 receive and convert to a power signal that charges a battery maintained on the robotic devices 490.

In some implementations, each of the robotic devices 490 has a corresponding and assigned charging station such that the number of robotic devices 490 equals the number of charging stations. In these implementations, the robotic devices 490 always navigate to the specific charging station assigned to that robotic device. For instance, a first robotic device 490 may always use a first charging station and a second robotic device 490 may always use a second charging station.

In some examples, the robotic devices 490 may share charging stations. For instance, the robotic devices 490 may use one or more community charging stations that are capable of charging multiple robotic devices 490. The community charging station may be configured to charge multiple robotic devices 490 in parallel. The community charging station may be configured to charge multiple robotic devices 490 in serial such that the multiple robotic devices 490 take turns charging and, when fully charged, return to a predefined home base or reference location in the property that is not associated with a charger. The number of community charging stations may be less than the number of robotic devices 490.

Also, the charging stations may not be assigned to specific robotic devices 490 and may be capable of charging any of the robotic devices 490. In this regard, the robotic devices 490 may use any suitable, unoccupied charging station when not in use. For instance, when one of the robotic devices 490 has completed an operation or is in need of battery charge, the control unit 410 references a stored table of the occupancy status of each charging station and instructs the robotic device 490 to navigate to the nearest charging station that is unoccupied.

The system 400 further includes one or more integrated security devices 480. The one or more integrated security devices may include any type of device used to provide alerts based on received sensor data. For instance, the one or more control units 410 may provide one or more alerts to the one or more integrated security input/output devices 480. Additionally, the one or more control units 410 may receive one or more sensor data from the sensors 420 and determine whether to provide an alert to the one or more integrated security input/output devices 480.

The sensors 420, the property automation controls 422, the thermal camera 430, the thermostat 434, and the integrated security devices 480 may communicate with the controller 412 over communication links 424, 426, 428, 432, and 484. The communication links 424, 426, 428, 432, and 484 may be a wired or wireless data pathway configured to transmit signals from the sensors 420, the property automation controls 422, the thermal camera 430, the thermostat 434, and the integrated security devices 480 to the controller 412. The sensors 420, the property automation controls 422, the thermal camera 430, the thermostat 434, and the integrated security devices 480 may continuously transmit sensed values to the controller 412, periodically transmit sensed values to the controller 412, or transmit sensed values to the controller 412 in response to a change in a sensed value.

The communication links 424, 426, 428, 432, and 484 may include a local network. The sensors 420, the property automation controls 422, the thermal camera 430, the thermostat 434, and the integrated security devices 480, and the controller 412 may exchange data and commands over the local network. The local network may include 802.11 "Wi-Fi" wireless Ethernet (e.g., using low-power Wi-Fi chipsets), Z-Wave, Zigbee, Bluetooth, "Homeplug" or other "Powerline" networks that operate over AC wiring, and a Category 5 (CAT5) or Category 6 (CAT6) wired Ethernet network. The local network may be a mesh network constructed based on the devices connected to the mesh network.

The monitoring server 460 is one or more electronic devices configured to provide monitoring services by exchanging electronic communications with the control unit 410, the one or more user devices 440 and 450, and the central alarm station server 470 over the network 405. For example, the monitoring server 460 may be configured to monitor events (e.g., alarm events) generated by the control unit 410. In this example, the monitoring server 460 may exchange electronic communications with the network module 414 included in the control unit 410 to receive information regarding events (e.g., alerts) detected by the control unit 410. The monitoring server 460 also may receive information regarding events (e.g., alerts) from the one or more user devices 440 and 450.

In some examples, the monitoring server 460 may route alert data received from the network module 414 or the one or more user devices 440 and 450 to the central alarm station server 470. For example, the monitoring server 460 may transmit the alert data to the central alarm station server 470 over the network 405.

The monitoring server 460 may store sensor data, thermal image data, and other monitoring system data received from the monitoring system and perform analysis of the sensor data, thermal image data, and other monitoring system data received from the monitoring system. Based on the analysis, the monitoring server 460 may communicate with and control aspects of the control unit 410 or the one or more user devices 440 and 450.

The monitoring server 460 may provide various monitoring services to the system 400. For example, the monitoring server 460 may analyze the sensor, thermal image, and other data to determine an activity pattern of a resident of the property monitored by the system 400. In some implementations, the monitoring server 460 may analyze the data for alarm conditions or may determine and perform actions at the property by issuing commands to one or more of the automation controls 422, possibly through the control unit 410.

The central alarm station server 470 is an electronic device configured to provide alarm monitoring service by exchanging communications with the control unit 410, the one or more mobile devices 440 and 450, and the monitoring server 460 over the network 405. For example, the central alarm station server 470 may be configured to monitor alerting events generated by the control unit 410. In this example, the central alarm station server 470 may exchange communications with the network module 414 included in the control unit 410 to receive information regarding alerting events detected by the control unit 410. The central alarm station server 470 also may receive information regarding alerting events from the one or more mobile devices 440 and 450 and/or the monitoring server 460.

The central alarm station server 470 is connected to multiple terminals 472 and 474. The terminals 472 and 474 may be used by operators to process alerting events. For example, the central alarm station server 470 may route alerting data to the terminals 472 and 474 to enable an operator to process the alerting data. The terminals 472 and 474 may include general-purpose computers (e.g., desktop personal computers, workstations, or laptop computers) that are configured to receive alerting data from a server in the central alarm station server 470 and render a display of information based on the alerting data. For instance, the controller 412 may control the network module 414 to transmit, to the central alarm station server 470, alerting data indicating that a sensor 420 detected motion from a motion sensor via the sensors 420. The central alarm station server 470 may receive the alerting data and route the alerting data to the terminal 472 for processing by an operator associated with the terminal 472. The terminal 472 may render a display to the operator that includes information associated with the alerting event (e.g., the lock sensor data, the motion sensor data, the contact sensor data, etc.) and the operator may handle the alerting event based on the displayed information.

In some implementations, the terminals 472 and 474 may be mobile devices or devices designed for a specific function. Although FIG. 4 illustrates two terminals for brevity, actual implementations may include more (and, perhaps, many more) terminals.

The one or more authorized user devices 440 and 450 are devices that host and display user interfaces. For instance, the user device 440 is a mobile device that hosts or runs one or more native applications (e.g., the smart home application 442). The user device 440 may be a cellular phone or a non-cellular locally networked device with a display. The user device 440 may include a cell phone, a smart phone, a tablet PC, a personal digital assistant ("PDA"), or any other portable device configured to communicate over a network and display information. For example, implementations may also include Blackberry-type devices (e.g., as provided by Research in Motion), electronic organizers, iPhone-type devices (e.g., as provided by Apple), iPod devices (e.g., as provided by Apple) or other portable music players, other communication devices, and handheld or portable electronic devices for gaming, communications, and/or data organization. The user device 440 may perform functions unrelated to the monitoring system, such as placing personal telephone calls, playing music, playing video, displaying pictures, browsing the Internet, maintaining an electronic calendar, etc.

The user device 440 includes a smart home application 442. The smart home application 442 refers to a software/firmware program running on the corresponding mobile device that enables the user interface and features described throughout. The user device 440 may load or install the smart home application 442 based on data received over a network or data received from local media. The smart home application 442 runs on mobile devices platforms, such as iPhone, iPod touch, Blackberry, Google Android, Windows Mobile, etc. The smart home application 442 enables the user device 440 to receive and process image and sensor data from the monitoring system.

The user device 450 may be a general-purpose computer (e.g., a desktop personal computer, a workstation, or a laptop computer) that is configured to communicate with the monitoring server 460 and/or the control unit 410 over the network 405. The user device 450 may be configured to display a smart home user interface 452 that is generated by the user device 450 or generated by the monitoring server 460. For example, the user device 450 may be configured to display a user interface (e.g., a web page) provided by the monitoring server 460 that enables a user to perceive images captured by the thermal camera 430 and/or reports related to the monitoring system. Although FIG. 4 illustrates two user devices for brevity, actual implementations may include more (and, perhaps, many more) or fewer user devices.

The smart home application 442 and the smart home user interface 452 can allow a user to interface with the property monitoring system 400, for example, allowing the user to view monitoring system settings, adjust monitoring system parameters, customize monitoring system rules, and receive and view monitoring system messages.

In some implementations, the one or more user devices 440 and 450 communicate with and receive monitoring system data from the control unit 410 using the communication link 438. For instance, the one or more user devices 440 and 450 may communicate with the control unit 410 using various local wireless protocols such as Wi-Fi, Bluetooth, Z-wave, Zigbee, HomePlug (ethernet over power line), or wired protocols such as Ethernet and USB, to connect the one or more user devices 440 and 450 to local security and automation equipment. The one or more user devices 440 and 450 may connect locally to the monitoring system and its sensors and other devices. The local connection may improve the speed of status and control communications because communicating through the network 405 with a remote server (e.g., the monitoring server 460) may be significantly slower.

Although the one or more user devices 440 and 450 are shown as communicating with the control unit 410, the one or more user devices 440 and 450 may communicate directly with the sensors 420 and other devices controlled by the control unit 410. In some implementations, the one or more user devices 440 and 450 replace the control unit 410 and perform the functions of the control unit 410 for local monitoring and long range/offsite communication.

In other implementations, the one or more user devices 440 and 450 receive monitoring system data captured by the control unit 410 through the network 405. The one or more user devices 440, 450 may receive the data from the control unit 410 through the network 405 or the monitoring server 460 may relay data received from the control unit 410 to the one or more user devices 440 and 450 through the network 405. In this regard, the monitoring server 460 may facilitate communication between the one or more user devices 440 and 450 and the monitoring system 400.

In some implementations, the one or more user devices 440 and 450 may be configured to switch whether the one or more user devices 440 and 450 communicate with the control unit 410 directly (e.g., through link 438) or through the monitoring server 460 (e.g., through network 405) based on a location of the one or more user devices 440 and 450. For instance, when the one or more user devices 440 and 450 are located close to the control unit 410 and in range to communicate directly with the control unit 410, the one or more user devices 440 and 450 use direct communication. When the one or more user devices 440 and 450 are located far from the control unit 410 and not in range to communicate directly with the control unit 410, the one or more user devices 440 and 450 use communication through the monitoring server 460.

Although the one or more user devices 440 and 450 are shown as being connected to the network 405, in some implementations, the one or more user devices 440 and 450 are not connected to the network 405. In these implementations, the one or more user devices 440 and 450 communicate directly with one or more of the monitoring system components and no network (e.g., Internet) connection or reliance on remote servers is needed.

In some implementations, the one or more user devices 440 and 450 are used in conjunction with only local sensors and/or local devices in a house. In these implementations, the system 400 includes the one or more user devices 440 and 450, the sensors 420, the property automation controls 422, the thermal camera 430, and the robotic devices 490. The one or more user devices 440 and 450 receive data directly from the sensors 420, the property automation controls 422, the thermal camera 430, and the robotic devices 490 (i.e., the monitoring system components) and sends data directly to the monitoring system components. The one or more user devices 440, 450 provide the appropriate interfaces/processing to provide visual surveillance and reporting.

In other implementations, the system 400 further includes network 405 and the sensors 420, the property automation controls 422, the thermal camera 430, the thermostat 434, and the robotic devices 490 are configured to communicate sensor and image data to the one or more user devices 440 and 450 over network 405 (e.g., the Internet, cellular network, etc.). In yet another implementation, the sensors 420, the property automation controls 422, the thermal camera 430, the thermostat 434, and the robotic devices 490 (or a component, such as a bridge/router) are intelligent enough to change the communication pathway from a direct local pathway when the one or more user devices 440 and 450 are in close physical proximity to the sensors 420, the property automation controls 422, the thermal camera 430, the thermostat 434, and the robotic devices 490 to a pathway over network 405 when the one or more user devices 440 and 450 are farther from the sensors 420, the property automation controls 422, the thermal camera 430, the thermostat 434, and the robotic devices 490. In some examples, the system leverages GPS information from the one or more user devices 440 and 450 to determine whether the one or more user devices 440 and 450 are close enough to the monitoring system components to use the direct local pathway or whether the one or more user devices 440 and 450 are far enough from the monitoring system components that the pathway over network 405 is required. In other examples, the system leverages status communications (e.g., pinging) between the one or more user devices 440 and 450 and the sensors 420, the property automation controls 422, the thermal camera 430, the thermostat 434, and the robotic devices 490 to determine whether communication using the direct local pathway is possible. If communication using the direct local pathway is possible, the one or more user devices 440 and 450 communicate with the sensors 420, the property automation controls 422, the thermal camera 430, the thermostat 434, and the robotic devices 490 using the direct local pathway. If communication using the direct local pathway is not possible, the one or more user devices 440 and 450 communicate with the monitoring system components using the pathway over network 405.

In some implementations, the system 400 provides end users with access to thermal images captured by the thermal camera 430 to aid in decision making. The system 400 may transmit the thermal images captured by the thermal camera 430 over a wireless WAN network to the user devices 440 and 450. Because transmission over a wireless WAN network may be relatively expensive, the system 400 can use several techniques to reduce costs while providing access to significant levels of useful visual information (e.g., compressing data, down-sampling data, sending data only over inexpensive LAN connections, or other techniques).

In some implementations, a state of the monitoring system and other events sensed by the monitoring system may be used to enable/disable video/image recording devices (e.g., the thermal camera 430 or other cameras of the system 400). In these implementations, the thermal camera 430 may be set to capture thermal images on a periodic basis when the alarm system is armed in an "armed away" state, but set not to capture images when the alarm system is armed in an "armed stay" or "unarmed" state. In addition, the thermal camera 430 may be triggered to begin capturing thermal images when the alarm system detects an event, such as an alarm event, a door-opening event for a door that leads to an area within a field of view of the thermal camera 430, or motion in the area within the field of view of the thermal camera 430. In other implementations, the thermal camera 430 may capture images continuously, but the captured images may be stored or transmitted over a network when needed.

The described systems, methods, and techniques may be implemented in digital electronic circuitry, computer hardware, firmware, software, or in combinations of these elements. Apparatus implementing these techniques may include appropriate input and output devices, a computer processor, and a computer program product tangibly embodied in a machine-readable storage device for execution by a programmable processor. A process implementing these techniques may be performed by a programmable processor executing a program of instructions to perform desired functions by operating on input data and generating appropriate output. The techniques may be implemented in one or more computer programs that are executable on a programmable system including at least one programmable processor coupled to receive data and instructions from, and to transmit data and instructions to, a data storage system, at least one input device, and at least one output device. Each computer program may be implemented in a high-level procedural or object-oriented programming language, or in assembly or machine language if desired; and in any case, the language may be a compiled or interpreted language. Suitable processors include, by way of example, both general and special purpose microprocessors. Generally, a processor will receive instructions and data from a read-only memory and/or a random-access memory. Storage devices suitable for tangibly embodying computer program instructions and data include all forms of non-volatile memory, including by way of example semiconductor memory devices, such as Erasable Programmable Read-Only Memory (EPROM), Electrically Erasable Programmable Read-Only Memory (EEPROM), and flash memory devices; magnetic disks such as internal hard disks and removable disks; magneto-optical disks; and Compact Disc Read-Only Memory (CD-ROM). Any of the foregoing may be supplemented by, or incorporated in, specially designed ASICs (application-specific integrated circuits).

It will be understood that various modifications may be made. For example, other useful implementations could be achieved if steps of the disclosed techniques were performed in a different order and/or if components in the disclosed systems were combined in a different manner and/or replaced or supplemented by other components. Accordingly, other implementations are within the scope of the disclosure.

What is claimed is:

1. A computer-implemented method comprising:
receiving, from a sensor of a property monitoring system that is configured to monitor a property, data that represents a person at the property;
determining, using the data received from the sensor, that the person located at the property exhibits symptoms of an impairment that affects a first sense that comprises one of taste, sight, touch, smell, or sound;

in response to determining the person located at the property exhibits symptoms of the impairment that affects the first sense, updating an impairment profile corresponding to the person to indicate that the first sense of the person is affected using a result of the determination that the person exhibits symptoms of the impairment;

determining that an event likely occurred at the property;

determining a monitoring system action a) to perform in response to the event and b) that has a first alert method;

based on the impairment that affects the first sense of the person, modifying, using the impairment profile updated in response to determining the person located at the property exhibits symptoms of the impairment that affects the first sense, the first alert method of the monitoring system action to a second, different alert method, from a plurality of alert methods, to be perceived by a second sense different than the first sense; and performing the monitoring system action using the second, different alert method.

2. The method of claim 1, wherein determining that the person located at the property exhibits symptoms of the impairment comprises:

analyzing the data received from the sensor; and comparing the analyzed data to data corresponding to known impairments.

3. The method of claim 1, wherein determining that the person located at the property exhibits symptoms of the impairment comprises:

providing the data received from the sensor to a machine learning model; and determining that the person located at the property exhibits symptoms of the impairment based on output of the machine learning model.

4. The method of claim 1, wherein modifying the first alert method of the monitoring system action comprises:

determining the first alert method is configured to be perceived by the first sense of the person affected by the impairment of the person; and determining the second, different alert method is configured to be perceived by the second sense.

5. The method of claim 1, wherein modifying the first alert method of the monitoring system action comprises:

generating a hierarchy of alert methods, wherein the hierarchy of the alert methods is based on one or more values each representing a likelihood of a given alert method of the alert methods being perceived by a person that exhibits symptoms of the impairment that affects the first sense; and based on the hierarchy of the alert methods, modifying the first alert method of the monitoring system action.

6. The method of claim 5, wherein generating the hierarchy of the alert methods comprises:

determining a status for one or more connected components of the property monitoring system, wherein the one or more connected components are used to implement one or more alert methods; and based on the status of the one or more connected components, generating the hierarchy of the alert methods.

7. The method of claim 1, determining that the event likely occurred at the property comprises:

determining a package likely arrived at the property.

8. The method of claim 7, wherein performing the monitoring system action using the second, different alert method comprises:

notifying the person of the package arrival using the second, different alert method.

9. A system comprising one or more computers and one or more storage devices on which are stored instructions that are operable, when executed by the one or more computers, to cause the one or more computers to perform operations comprising:

maintaining, in memory and for a monitoring system that is configured to monitor a property, data that indicates that a person located at the property exhibits symptoms of an impairment that affects a first sense that comprises one of taste, sight, touch, smell, or sound and likely does not have another impairment that affects a second sense different than the first sense;

determining that an event likely occurred at the property;

before performing a monitoring system action for the event and in response to determining that the person located at the property exhibits symptoms of the impairment that affects the first sense, determining a modified monitoring system action that i) modifies a default monitoring system action to perform in response to the event and ii) includes a different alert method configured to be perceived by the second sense different than the first sense; and performing the modified monitoring system action.

10. The system of claim 9, wherein the operations comprise:

analyzing the data that indicates that the person located at the property exhibits symptoms of the impairment; and determining that the person located at the property exhibits symptoms of the impairment by comparing the analyzed data to data corresponding to known impairments.

11. The system of claim 9, wherein the operations comprise:

providing the data that indicates that the person located at the property exhibits symptoms of the impairment to a machine learning model; and determining that the person located at the property exhibits symptoms of the impairment based on output of the machine learning model.

12. The system of claim 9, wherein maintaining the data that indicates that the person located at the property exhibits symptoms of the impairment comprises:

updating an impairment profile corresponding to the person based on determining that the person located at the property exhibits symptoms of the impairment.

13. The system of claim 12, wherein determining the modified monitoring system action comprises:

accessing the impairment profile corresponding to the person; and modifying the default monitoring system action using the impairment profile.

14. The system of claim 9, wherein determining the modified monitoring system action comprises:

determining an alert method of the default monitoring system action is configured to be perceived by the first sense of the person affected by the impairment of the person; and determining the different alert method is configured to be perceived by the second sense.

15. The system of claim 9, wherein determining the modified monitoring system action comprises:

generating a hierarchy of monitoring system actions, wherein the hierarchy of the monitoring system actions is based on one or more values each representing a likelihood of a given monitoring system action of the monitoring system actions being perceived by the person that exhibits symptoms of the impairment; and based on the hierarchy of the monitoring system actions, modifying the monitoring system action.

16. The system of claim 15, wherein generating the hierarchy of the monitoring system actions comprises:

determining a status for one or more connected components of the monitoring system, wherein the one or more connected components are used to implement one or more monitoring system actions; and based on the status of the one or more connected components, generating the hierarchy of the monitoring system actions.

17. A non-transitory computer storage medium encoded with instructions that, when executed by one or more computers, cause the one or more computers to perform operations comprising:

receiving, from a sensor of a property monitoring system that is configured to monitor a property, data that represents a person at the property;

determining, using the data received from the sensor, that the person located at the property exhibits symptoms of an impairment that affects a first sense that comprises one of taste, sight, touch, smell, or sound;

in response to determining the person located at the property exhibits symptoms of the impairment that affects the first sense, updating an impairment profile corresponding to the person to indicate that the first sense of the person is affected using a result of the determination that the person exhibits symptoms of the impairment;

determining that an event likely occurred at the property;

determining a monitoring system action a) to perform in response to the event and b) that has a first alert method;

based on the impairment that affects the first sense of the person, modifying, using the impairment profile updated in response to determining the person located at the property exhibits symptoms of the impairment that affects the first sense, the first alert method of the monitoring system action to a second, different alert method, from a plurality of alert methods, to be perceived by a second sense different than the first sense; and performing the monitoring system action using the second, different alert method.

18. The non-transitory computer storage medium of claim 17, wherein determining that the person located at the property exhibits symptoms of the impairment comprises:

analyzing the data received from the sensor; and comparing the analyzed data to data corresponding to known impairments.

19. The non-transitory computer storage medium of claim 17, wherein modifying the first alert method of the monitoring system action comprises:

generating a hierarchy of alert methods, wherein the hierarchy of the alert methods is based on one or more values each representing a likelihood of a given alert method of the alert methods being perceived by a person that exhibits symptoms of the impairment that affects the first sense; and based on the hierarchy of the alert methods, modifying the first alert method of the monitoring system action.

20. The non-transitory computer storage medium of claim 19, wherein generating the hierarchy of the alert methods comprises:

determining a status for one or more connected components of the property monitoring system, wherein the one or more connected components are used to implement one or more alert methods; and based on the status of the one or more connected components, generating the hierarchy of the alert methods.

* * * * *